(12) United States Patent
Kim et al.

(10) Patent No.: US 10,665,861 B2
(45) Date of Patent: May 26, 2020

(54) POSITIVE ACTIVE MATERIAL INCLUDING LITHIUM NICKEL-BASED METAL OXIDE, METHOD OF PREPARING THE SAME, AND RECHARGEABLE LITHIUM BATTERY INCLUDING THE SAME

(71) Applicant: SAMSUNG SDI CO., LTD., Yongin-si, Gyeonggi-do (KR)

(72) Inventors: Dongjin Kim, Yongin-si (KR); Minhan Kim, Yongin-si (KR); Dohyung Park, Yongin-si (KR); Young Jin Park, Yongin-si (KR); Kyounghyun Kim, Yongin-si (KR); Ilseok Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 158 days.

(21) Appl. No.: 15/795,550

(22) Filed: Oct. 27, 2017

(65) Prior Publication Data

US 2018/0123130 A1 May 3, 2018

(30) Foreign Application Priority Data

Oct. 28, 2016 (KR) .................. 10-2016-0142172

(51) Int. Cl.
*H01M 4/525* (2010.01)
*H01M 4/04* (2006.01)
(Continued)

(52) U.S. Cl.
CPC ............ *H01M 4/525* (2013.01); *C01G 53/50* (2013.01); *H01M 4/0471* (2013.01);
(Continued)

(58) Field of Classification Search
CPC .... H01M 4/525; H01M 4/0471; H01M 4/131; H01M 4/1391; H01M 4/366; H01M 4/483; H01M 4/505
(Continued)

(56) References Cited

U.S. PATENT DOCUMENTS

2005/0042514 A1   2/2005  Sun et al.
2005/0227147 A1*  10/2005 Kogetsu ............... H01M 4/049
                                                                    429/231.95
(Continued)

FOREIGN PATENT DOCUMENTS

JP      2004119110 A  *  4/2004
KR    2003-0032182 A      4/2003
(Continued)

OTHER PUBLICATIONS

Sung Nam Lim, et al., "Enhanced elevated-temperature performance of Li(Ni0.8Co0.15Al0.05)O2 electrodes coated with Li2O—2B2O3 glass", Electrochimica Acta 136 (2014) 1-9.

*Primary Examiner* — Sean P Cullen
(74) *Attorney, Agent, or Firm* — Lee IP Law, PC

(57) ABSTRACT

A positive active material for a rechargeable lithium battery includes a lithium nickel-based metal oxide represented by $Li_xNi_{1-y}M_yO_2$ and a lithium-containing oxide on a surface of the lithium nickel-based metal oxide. In the formula $Li_xNi_{1-y}M_yO_2$, M is one or more of Co, Mn, Al, Mg, Ti, Zr, or a combination thereof, $0<x<1.1$, and $0\leq y<0.5$.

15 Claims, 3 Drawing Sheets

(51) Int. Cl.
*H01M 4/1391* (2010.01)
*C01G 53/00* (2006.01)
*H01M 4/131* (2010.01)
*H01M 4/36* (2006.01)
*H01M 4/48* (2010.01)
*H01M 4/505* (2010.01)
*H01M 10/0525* (2010.01)

(52) U.S. Cl.
CPC ......... *H01M 4/131* (2013.01); *H01M 4/1391* (2013.01); *H01M 4/366* (2013.01); *H01M 4/483* (2013.01); *H01M 4/505* (2013.01); *H01M 10/0525* (2013.01); *C01P 2002/50* (2013.01); *C01P 2004/03* (2013.01); *C01P 2006/40* (2013.01)

(58) Field of Classification Search
USPC .................................. 429/223, 231.1, 231.95
See application file for complete search history.

(56) References Cited

U.S. PATENT DOCUMENTS

| | | | | |
|---|---|---|---|---|
| 2006/0194114 A1* | 8/2006 | Saito | ..................... | H01M 4/131 429/232 |
| 2007/0082265 A1* | 4/2007 | Itou | ....................... | H01M 4/131 429/223 |
| 2008/0268340 A1* | 10/2008 | Kuwahara | ............ | H01M 4/485 429/223 |
| 2011/0281168 A1* | 11/2011 | Watanabe | ............ | H01M 4/525 429/223 |
| 2014/0093786 A1 | 4/2014 | Ito et al. | | |
| 2014/0158932 A1* | 6/2014 | Sun | ........................ | H01M 4/13 252/182.1 |
| 2015/0243971 A1* | 8/2015 | Cho | ....................... | H01M 4/366 429/223 |
| 2016/0099460 A1* | 4/2016 | Toyama | ................ | H01M 4/382 429/223 |
| 2017/0222221 A1* | 8/2017 | Park | ...................... | H01M 4/505 |
| 2018/0013129 A1* | 1/2018 | Lee | ......................... | H01M 2/10 |

FOREIGN PATENT DOCUMENTS

| | | |
|---|---|---|
| KR | 10-2014-0025102 A | 3/2014 |
| KR | 10-2014-0074174 A | 6/2014 |
| WO | WO-2016068594 A1 * 5/2016 | ............ H01M 4/505 |
| WO | WO-2016204563 A1 * 12/2016 | .............. H01M 2/10 |

* cited by examiner

[FIG. 4]
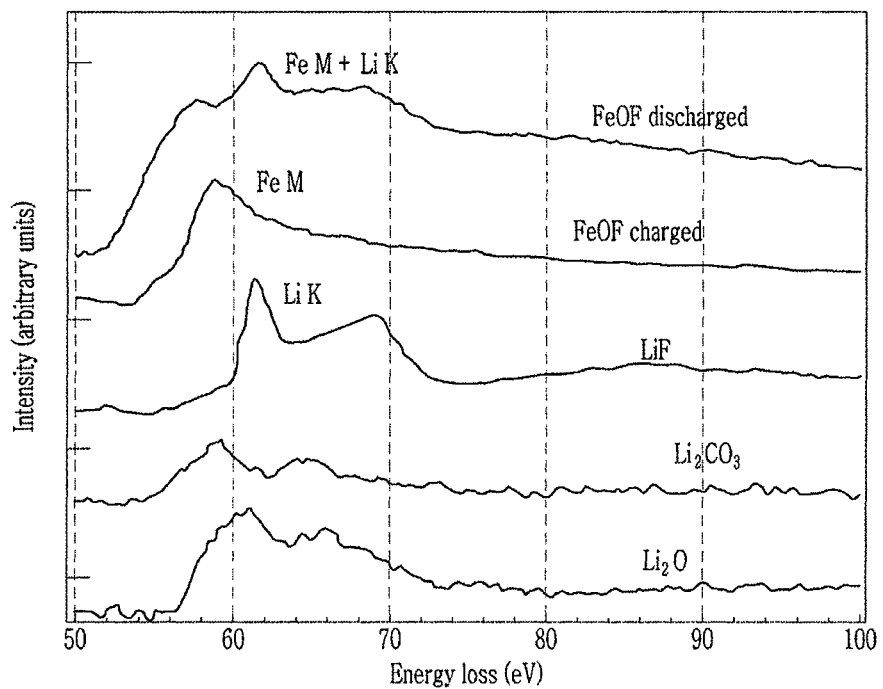
[FIG. 5]
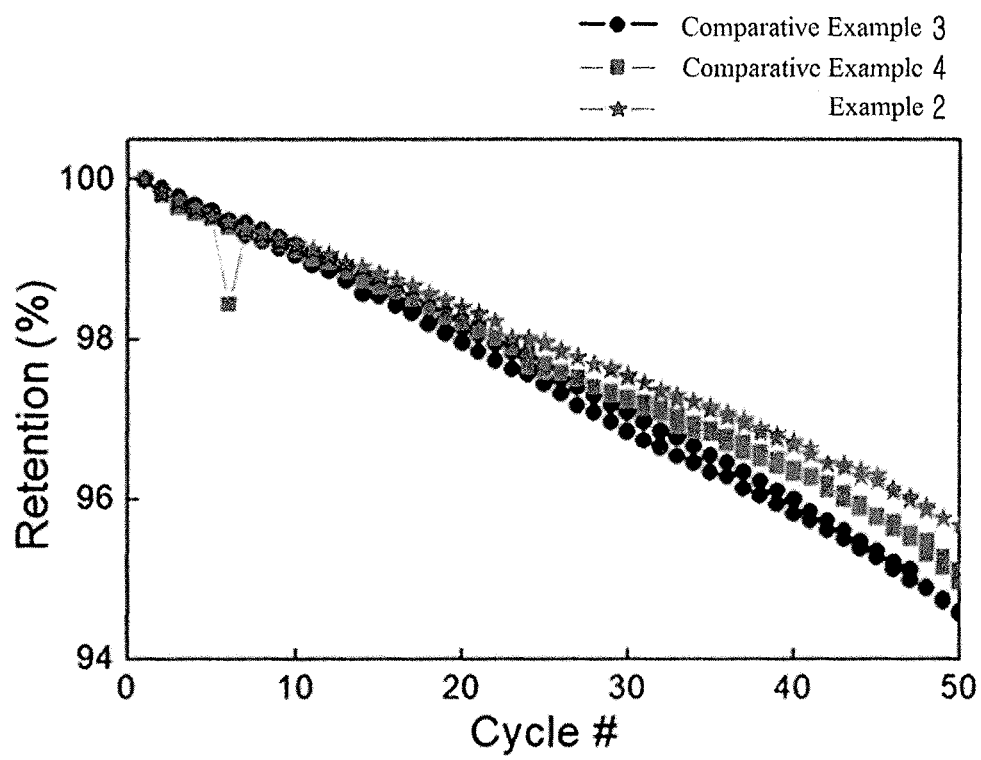

POSITIVE ACTIVE MATERIAL INCLUDING LITHIUM NICKEL-BASED METAL OXIDE, METHOD OF PREPARING THE SAME, AND RECHARGEABLE LITHIUM BATTERY INCLUDING THE SAME

CROSS-REFERENCE TO RELATED APPLICATION

Korean Patent Application No. 10-2016-0142172 filed on Oct. 28, 2016, and entitled, "Positive Active Material for Rechargeable Lithium Battery, Method of Preparing the Same, and Rechargeable Lithium Battery Including the Same," is incorporated by reference herein in its entirety.

BACKGROUND

1. Field

One or more embodiments described herein relate to a positive active material for a rechargeable lithium battery, a method for preparing a positive active material for a rechargeable lithium battery, and a rechargeable lithium battery including a positive active material for a rechargeable lithium battery.

2. Description of the Related Art

Rechargeable lithium batteries power many types of electronic devices, systems, and vehicles. These batteries use an organic electrolyte solution and thus may have greater discharge voltage and energy density than batteries that use an alkali aqueous solution.

A rechargeable lithium battery may be manufactured by an injecting an electrolyte solution into a battery cell. A negative electrode of the battery cell may include a negative active material capable of intercalating/deintercalating lithium. A positive electrode of the battery cell may include a positive active material capable of intercalating/deintercalating lithium. The positive active material for the positive electrode may include lithium-transition element composite oxides for intercalating lithium. Examples include $LiCoO_2$, $LiMn_2O_4$, $LiNiO_2$, $LiNi_{1-x}Co_xO_2 (0<x<1)$, $LiMnO_2$.

One type of rechargeable lithium battery uses a lithium nickel-based oxide. The content of nickel (Ni) is sufficiently large to improve energy density, despite low discharge voltage and volumetric density. When the lithium nickel-based oxide is used as a positive active material, a large amount of lithium may remain on the surface of the positive active material. This causes a deterioration in cycle characteristics, and also lowers stability and impedes long term use.

SUMMARY

In accordance with one or more embodiments, a positive active material for a rechargeable lithium battery includes a lithium nickel-based metal oxide represented by Chemical Formula 1 and a lithium-containing oxide on a surface of the lithium nickel-based metal oxide:

$$Li_xNi_{1-y}M_yO_2 \quad (1)$$

where M is one or more of Co, Mn, Al, Mg, Ti, Zr, or a combination thereof and where $0<x<1.1$ and $0\leq y<0.5$. In Chemical Formula 1, it may be that $0.1\leq y\leq 0.4$.

Chemical Formula 1 may be represented by Chemical Formula 2 or Chemical Formula 3:

$$Li_xNi_{1-a-b}Co_aAl_bO_2 \quad (2)$$

$$Li_xNi_{1-a-b}Co_aMn_bO_2 \quad (3)$$

where $0<x<1.1$, $0<a<0.5$, $0<b<0.5$, and $0<a+b<0.5$ in Chemical Formula 2 and Chemical Formula 3. The lithium-containing oxide may include at least one of $Li_2O$, $LiOH$, and $Li_2CO_3$. The lithium-containing oxide may be included in an amount of about 0.01 to about 10 parts by weight based on 100 parts by weight of the lithium nickel-based metal oxide.

The lithium-containing oxide may be a coating layer that coats a part or a whole of the surface of the lithium nickel-based metal oxide. The coating layer of the lithium-containing oxide may have a rod shape or scale shape. The coating layer may have a rod shape has an aspect ratio of greater than or equal to about 1.

In accordance with one or more other embodiments, a method for preparing a positive active material for a rechargeable lithium battery may include mixing a lithium raw material and a nickel-containing metal oxide precursor to prepare a mixture, heat-treating the mixture to prepare a lithium nickel-based metal oxide represented by Chemical Formula 1, $$Li_xNi_{1-y}M_yO_2 \quad (1)$$

where M is one or more of Co, Mn, Al, Mg, Ti, Zr, or a combination thereof and where $0<x<1.1$ and $0\leq y<0.5$, and dry-mixing the lithium nickel-based metal oxide with a lithium-containing oxide followed by heat treatment. In Chemical Formula 1, y may be within the range of $0.1\leq y\leq 0.4$ in Chemical Formula 1.

The nickel-containing metal oxide precursor may be represented by Chemical Formula 4:

$$Me(OH)_2 \quad (4)$$

where Me is represented by Chemical Formula 5, $$Ni_kM_{1-k} \quad (5)$$

where M is one or more of Co, Mn, Al, Mg, Ti, Zr, or a combination thereof and where $0.5<k\leq 1.0$. The lithium-containing oxide may be $Li_2O$ LiOH and $Li_2CO_3$ includes at least one of $Li_2O$, LiOH, and $Li_2CO_3$. The lithium-containing oxide may be included in an amount of about 0.01 to about 10 parts by weight based on 100 parts by weight of the lithium nickel-based metal oxide.

The mixture of the lithium raw material and nickel-containing metal oxide precursor may be heat-treated at about 600° C. to about 1,000° C. A dry-mixture of the lithium nickel-based metal oxide with a lithium-containing oxide may be heat-treated at about 400° C. to about 700° C.

In accordance with one or more other embodiments, a rechargeable lithium battery includes the positive electrode including a positive active material as previously described, a negative electrode, and an electrolyte solution.

BRIEF DESCRIPTION OF THE DRAWINGS

Features will become apparent to those of skill in the art by describing in detail exemplary embodiments with reference to the attached drawings in which:

FIG. 4 illustrates an example of an EELS (Electron Energy Loss Spectroscopy) graph for the positive active material of FIGS. 2 and 3; and FIG. 5 illustrates an example of a graph of cycle-life characteristics of rechargeable lithium battery cells according to an example of the rechargeable lithium battery and two Comparative Examples.

DETAILED DESCRIPTION

Figure 1:
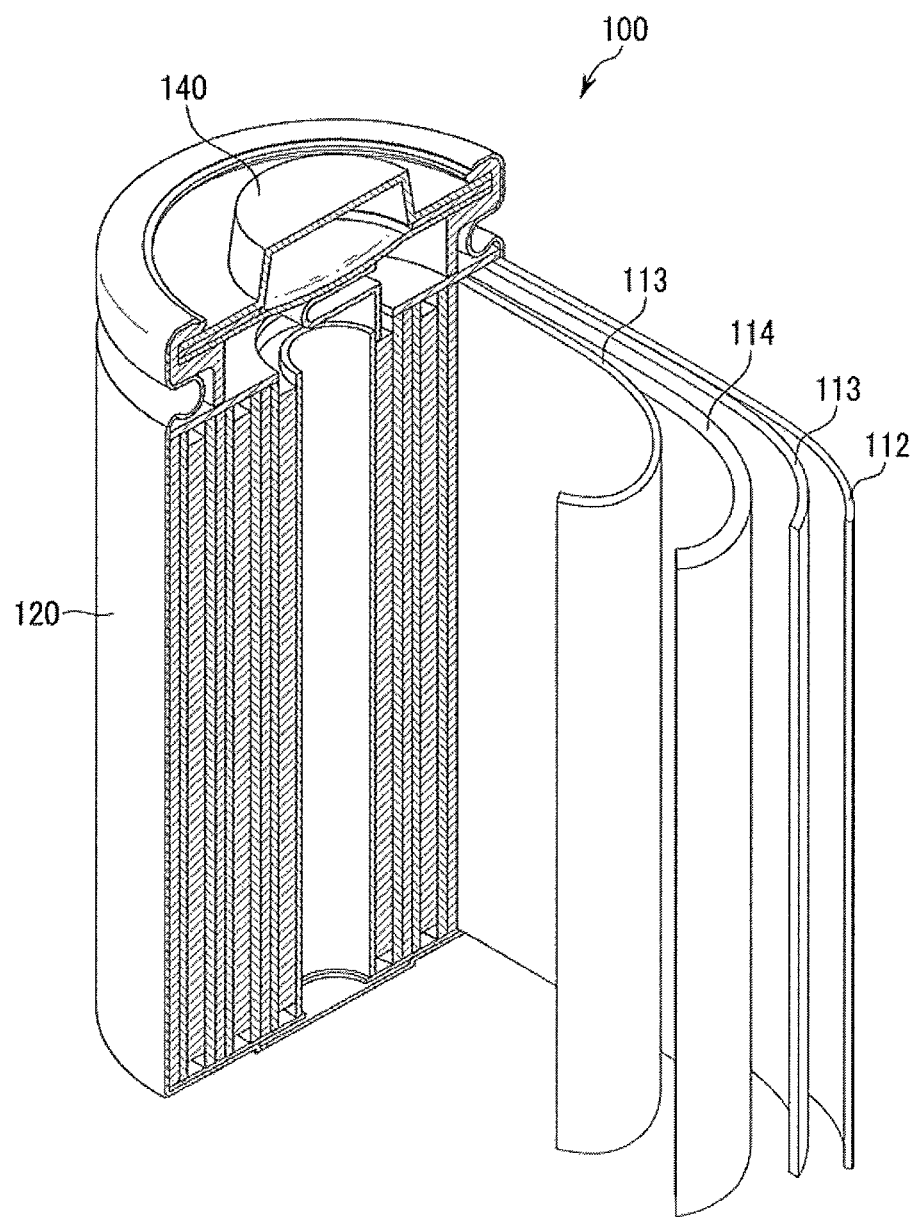
FIG. 1 illustrates an embodiment of a rechargeable lithium battery.

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

In accordance with one or more embodiments, a positive active material for a rechargeable lithium battery and a method of preparing a positive active material for a rechargeable lithium battery are described. According to one embodiment, the positive active material includes a lithium nickel-based metal oxide and a lithium-containing oxide on a surface of the lithium nickel-based metal oxide. The lithium nickel-based metal oxide may be a compound represented by Chemical Formula 1: $Li_xNi_{1-y}M_yO_2$, where M is Co, Mn, Al, Mg, Ti, Zr, or a combination thereof and where $0<x<1.1$ and $0\leq y<0.5$.

The lithium nickel-based metal oxide represented by Chemical Formula 1 is Ni-rich oxide including nickel (Ni), for example, in an amount of greater than or equal to about 50 mol % based on a total amount of metals, except for lithium, and thus may be regarded as a next generation positive active material due to high capacity.

However, under some conditions, the Ni-rich positive active material may be difficult to synthesize with a proportion to lithium relative to other metals. In addition, a cation mixing phenomenon (where $Li^+$ and $Ni^{2+}$ positions are switched during charging and discharging) may repeatedly occur. The Ni-rich positive active material may have a side reaction with an organic electrolyte component. Accordingly, performance of a battery, and particularly its cycle-life characteristics, may be easily deteriorated.

One approach that has been proposed attempts to stabilize the internal structure of the Ni-rich positive active material by substituting a heterogeneous element (Al, Fe, Ge) in the Ni-rich positive active material and reducing reactivity with an organic electrolyte, by modifying the surface of the positive active material (e.g., $Al_2O_3$, $TiO_2$, $AlF_3$). In addition, the Ni-rich positive active material sensitively reacts with the organic electrolyte according to conditions of a heat treatment, and thus tends to have more lithium ions remaining on the surface after the synthesis compared with other active materials. The lithium ions remaining on the surface may deteriorate a battery cycle-life and generate gas. In order to solve these problems, various efforts have been made in attempt to optimize the firing process and coat the surface.

The present inventors have determined that the amount of lithium ions remaining on the surface of a Ni-rich positive active material may be reduced by decreasing the amount of lithium relative to that of a metal to manufacture lithium nickel-based metal oxides. In addition, the Ni-rich positive active material may be coated with lithium-containing oxide on the surface, in order to reduce the amount of lithium ions remaining on the surface. The resulting positive active material may realize a rechargeable lithium battery having high stability without generating gas and may as well improve cycle-life characteristics.

Accordingly to one embodiment, a rechargeable lithium battery with high capacity is achieved through a surface modification of Ni-rich oxides. Such a battery has excellent stability due to a small amount of gas generation and also demonstrates excellent cycle-life characteristics. In one embodiment, a smaller amount of lithium than metal is used to reduce residual lithium from the synthesis of lithium nickel-based metal oxide. Additionally, or alternatively, the lithium nickel-based metal oxide may be coated with a lithium-containing oxide in order to reduce residual lithium. The surface modification of Ni-rich oxide provides the lithium nickel-based metal oxide having the lithium-containing oxide on the surface as a positive active material. Thus, the positive active material may produce a rechargeable lithium battery having excellent rate capability, high capacity, and/or life cycle characteristics.

In accordance with one embodiment, a method for preparing a positive active material includes the following. First, a smaller amount of lithium than metal is used to reduce residual lithium from the synthesis of a lithium nickel-based metal oxide. For example, the lithium nickel-based metal oxide represented by Chemical Formula 1 may be manufactured by mixing a lithium raw material with a metal oxide precursor including nickel. The mixture may be prepared to include lithium in the lithium raw material and the lithium nickel-based metal oxide within a mol range of less than about 1.1, for example, greater than or equal to about 0.85 to less than about 1.1, based on the content of the entire metals, except for the lithium. In one embodiment, the mol range may be, for example, greater than or equal to about 0.9 to less than about 1.1, or greater than or equal to about 0.95 to less than about 1.1, based on the content of the entire metals, except for the lithium. The lithium raw material may be, for example, $Li_2CO_3$, LiOH, or another compound.

The lithium nickel-based metal oxide precursor mixed with the lithium raw material may be represented by Chemical Formula 4: $Me(OH)_2$, where Me may be represented by Chemical Formula 5: $Ni_kM_{1-k}$. In Chemical Formula 5, M may be, for example, one or more of Co, Mn, Al, Mg, Ti, Zr, or a combination thereof and $0.5<k\leq1.0$. In one embodiment, the lithium nickel-based metal oxide precursor may be $NiCoMn(OH)_2$ or $NiCoMn(Cl)_2$.

Then, the mixture of the lithium raw material and the lithium nickel-based metal oxide precursor is heat-treated.

The heat-treating may be performed, for example, at a temperature of about 600° C. to about 1,000° C., e.g., about 700° C. to about 1,000° C., about 800° C. to about 1,000° C., or about 900° C. to about 1,000° C. The heat treatment may be performed under an oxygen atmosphere for about 10 hours.

Through the heat treatment, the lithium raw material (LiOH, $LiCO_2$) surrounding the lithium nickel-based metal oxide precursor is decomposed as its temperature is increased and thus permeates into the lithium nickel-based metal oxide precursor. In addition, the lithium nickel-based metal oxide precursor may also be decomposed due to the temperature increase and react with Li ions of the lithium raw material. As a result, the lithium nickel-based metal oxide represented by Chemical Formula 1 may be produced.

Another approach which has been proposed uses a Ni-rich positive active material, where the content ratio between lithium and other metals is difficult to adjust. This is because a reaction proceeds before lithium reaches the center of a metal oxide precursor during the heat treatment due to a small difference of decomposition temperature (about 850° C.) of nickel and decomposition temperature (about 720° C.) of the lithium raw material. In addition, the lithium may not permeate into the metal oxide precursor, but may remain on the surface of a metal oxide.

In accordance with one embodiment, the lithium remaining on the surface of lithium nickel-based metal oxide is removed using lithium in a smaller amount than that of a metal from the synthesis, in order to reduce the residual lithium. Also, a lithium-containing oxide may be coated on the surface of the manufactured lithium nickel-based metal oxide to secondarily the residual lithium. For example, the lithium remaining on the surface of the oxide may be removed by dry-mixing the manufactured lithium nickel-based metal oxide with a lithium-containing oxide and heat-treating the mixture to coat the lithium-containing oxide on the surface of the lithium nickel-based metal oxide.

The lithium-containing oxide may include, for example, at least one of $Li_2O$ LiOH and $Li_2CO_3$, although a different oxide may be used in another embodiment. The lithium-containing oxide on the surface of the lithium nickel-based metal oxide may include Li in a smaller amount than Li included in the lithium nickel-based metal oxide.

The lithium-containing oxide is formed on the surface of the lithium nickel-based metal oxide during a process of manufacturing a positive active material, which may be confirmed through an EELS (Electron Energy Loss Spectroscopy) curved line.

The lithium-containing oxide prevents direct contact of an electrolyte solution with a positive active material at a high voltage and suppresses a side reaction. Accordingly, a rechargeable lithium battery having excellent stability (due to a small amount of gas generation) and improved cycle-life characteristics may be obtained.

The lithium nickel metal oxide and the lithium-containing oxide may be additionally heat-treated at about 400° C. to about 700° C., for example, about 500° C. to about 700° C., or about 600° C. to about 700° C. The additional heat treatment may be performed, for example, under an oxygen atmosphere for about 6 hours.

The lithium remaining on the surface of the lithium nickel-based metal oxide may be $Li_2CO_3$, LiOH, or a combination thereof. In an embodiment, the lithium-containing oxide reacts with lithium (e.g., LiOH, $Li_2CO_3$) remaining on the surface of the lithium nickel-based metal oxide precursor and thus forms $Li_aO_b$ and the like and removes the residual lithium.

The lithium-containing oxide may be included in an amount of, for example, about 0.01 parts by weight to about 10 parts by weight, for example, about 0.01 parts by weight to about 9 parts by weight, about 0.01 parts by weight to about 8 parts by weight, about 0.01 parts by weight to about 7 parts by weight, about 0.01 parts by weight to about 6 parts by weight, about 0.01 parts by weight to about 5 parts by weight, about 0.05 parts by weight to about 10 parts by weight, about 0.1 parts by weight to about 10 parts by weight, or about 0.2 parts by weight to about 10 parts by weight based on 100 parts by weight of the lithium nickel-based metal oxide. When the lithium-containing oxide is present within these ranges on the surface of the lithium nickel-based metal oxide, a rechargeable lithium battery having excellent battery stability, excellent cycle-life characteristics, and high-capacity may be realized.

When a positive active material for a rechargeable lithium battery is manufactured by this manufacturing method, the amount of lithium remaining on the surface of the positive active material may be effectively reduced. In one embodiment, the amount of lithium remaining on the surface of the positive active material may be less than about 1.0 wt %, for example, less than about 0.9 wt %, for example, and less than about 0.5 wt % based on a total weight of the positive active material.

According to ne embodiment, the lithium nickel-based metal oxide may be a compound represented by Chemical Formula 1: $Li_xNi_{1-y}M_yO_2$, where M is one or more of Co, Mn, Al, Mg, Ti, Zr, or a combination thereof and where $0<x<1.1$ and $0 \leq y<0.5$. For example, in Chemical Formula 1, Li may be included in a mole ratio of about 1.1 with metal except for lithium in the lithium nickel-based metal oxide, with x in a range of $0.55 \leq x<1.1$, for example, $0.6 \leq x<1.1$, for example, $0.65 \leq x<1.1$, for example, $0.7 \leq x<1.1$, for example, $0.8 \leq x<1.1$, for example, $0.9 \leq x<1.1$, or for example, $0.95 \leq x<1.1$. Also, in Chemical Formula 1, y may be, for example, in the following ranges: $0.05 \leq y<0.5$, $0.05 \leq y \leq 0.45$, $0.1 \leq y \leq 0.4$, or $0.1 \leq y \leq 0.3$.

The lithium nickel-based metal oxide represented by Chemical Formula 1 may be represented by Chemical Formula 2 corresponding to $Li_xNi_{1-a-b}CO_aAl_bO_2$ or Chemical Formula 3 corresponding to $Li_xNi_{1-a-b}CO_aMn_bO_2$. In Chemical Formulae 2 and 3, $0<x<1.1$, $0<a<0.5$, $0<b<0.5$, and $0<a+b<0.5$. In example embodiments, the a+b may be, for example, in the following ranges: $0.05 \leq a+b<0.5$, $0.05 \leq a+b \leq 0.45$, or $0.1 \leq a+b \leq 0.4$.

In example embodiments, the lithium nickel-based metal oxide may further include metal corresponding to at least one of Zn, Fe, P, Cr, Mo, W, Ge, or a combination thereof, in addition to the metal represented by M in Chemical Formula 1. These additional metals may be included, for example, in a range of about 0.01 wt % to about 10 wt % based on a total weight of nickel and a metal represented by M in the lithium nickel-based metal oxide. These additional metals may further stabilize an internal structure of the lithium nickel-based metal oxide.

When the lithium nickel-based metal oxide represented by Chemical Formula 1 (e.g., a lithium nickel-based metal oxide including nickel in a large amount) is used as a positive active material, a rechargeable lithium battery having excellent electrochemical characteristics (e.g., rate capability and the like) and high capacity may be realized.

The lithium-containing oxide on the surface of the lithium nickel-based metal oxide may form a coating layer that coats a part or a whole of the surface of the lithium nickel-based metal oxide. In example embodiments, the lithium-containing oxide may include at least one of $Li_2O$, $LiOH$, and $Li_2CO_3$.

As shown in the embodiment, stability of a battery may be improved by forming the lithium-containing oxide on the surface of the lithium nickel-based metal oxide to reduce lithium ions remaining on the surface of the lithium nickel-based metal oxide after synthesis. Thus, the amount of gas generation may be reduced during charging and discharging of the battery.

Figure 3:
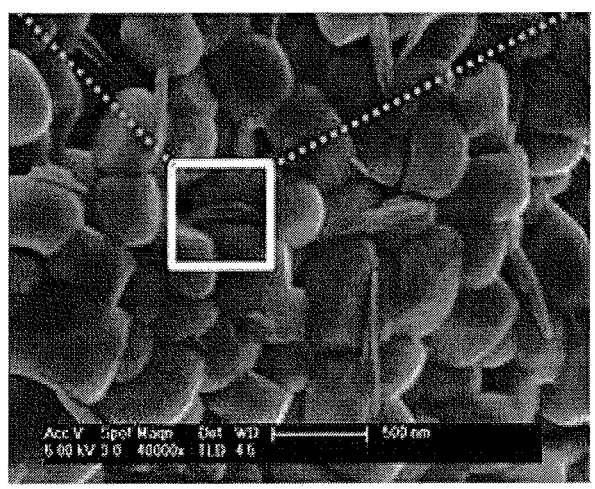

As shown in FIG. 3, the coating layer of the lithium-containing oxide may have, for example, a rod shape or scale shape. When the coating layer has a rod shape, an aspect ratio may be greater than or equal to about 1.

FIG. 1 illustrates an embodiment of a rechargeable lithium battery 100 which includes an electrode assembly including a separator 113 between a negative electrode 112 and a positive electrode 114, an electrolyte solution impregnating the positive electrode 114, the negative electrode 112, and the separator 113, a battery case 120 housing the electrode assembly, and a sealing member 140 sealing the battery case 120.

The positive electrode 114 includes a positive active material layer on a current collector. The positive active material layer includes a positive active material, binder and optionally a conductive material. The current collector may use Al, but is not limited thereto. The positive active material may be the same as described above.

The binder improves binding properties of positive active material particles with one another and with a current collector. Examples of the binder include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, and an epoxy resin.

The conductive material may improve electrical conductivity of the electrode. Any electrically conductive material may be used as the conductive material, unless, for example, it causes an adverse chemical change. Examples include one or more of natural graphite, artificial graphite, carbon black, acetylene black, ketjen black, a carbon fiber, a metal powder or a metal fiber of a copper, nickel, aluminum, silver, and a conductive material such as a polyphenylene derivative and the like.

The negative electrode 112 includes a negative active material layer on a current collector. The current collector may use Cu, but is not limited thereto. The negative active material layer includes a negative active material, a binder, and optionally a conductive material.

The negative active material includes a material that reversibly intercalates/deintercalates lithium ions, lithium metal, lithium metal alloy, a material being capable of doping and dedoping lithium, or transition metal oxide. Examples of a material that reversibly intercalates/deintercalates lithium ions include a carbon material, which may be a generally-used carbon-based negative active material in a rechargeable lithium battery. Examples thereof may be crystalline carbon, amorphous carbon or a mixture thereof. Examples of the crystalline carbon may be non-shaped, sheet-shaped, flake-shaped, spherical shape or fiber-shaped natural graphite or artificial graphite, and examples of the amorphous carbon may be soft carbon (low temperature fired carbon) or hard carbon, a mesophase pitch carbonized product, fired coke, and the like.

The lithium metal alloy may be an alloy of lithium and a metal of, for example, Na, K, Rb, Cs, Fr, Be, Mg, Ca, Sr, Si, Sb, Pb, In, Zn, Ba, Ra, Ge, Al, and Sn.

The material being capable of doping and dedoping lithium may be, for example, Si, $SiO_x$ (0<x<2), a Si—C composite, a Si-Q alloy (wherein Q is an alkali metal, an alkaline-earth metal, Group 13 to Group 16 elements, a transition metal, a rare earth element or a combination thereof, and not Si), Sn, $SnO_2$, a Sn—C composite, Sn—R (wherein R is an alkali metal, an alkaline-earth metal, Group 13 to Group 16 elements, a transition metal, a rare earth element or a combination thereof, and not Sn), and the like, and at least one thereof may be used with $SiO_2$. Examples of the Q and R include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may be vanadium oxide, lithium vanadium oxide.

The binder improves binding properties of negative active material particles with one another and with a current collector. Examples thereof include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and nylon.

The conductive material improves electrical conductivity of an electrode. Any electrically conductive material may be used as a conductive material, unless, for example, it causes an adverse chemical change. Examples thereof include a carbon-based material such as natural graphite, artificial graphite, carbon black, acetylene black, ketjen black, a carbon fiber and the like; a metal-based material such as a metal powder, a metal fiber, and the like of copper, nickel, aluminum, silver, and the like; a conductive polymer such as a polyphenylene derivative and the like; or a mixture thereof.

The negative electrode 112 and the positive electrode 114 are prepared by mixing each active material, a conductive material and a binder in a solvent to prepare slurry. The slurry may be coated on a current collector. The solvent may use an organic solvent (e.g., N-methylpyrrolidone). The solvent may be an aqueous solvent such as water according, for example, to the kind of binder.

The electrolyte solution may include, for example, an organic solvent and a lithium salt. The organic solvent serves as a medium for transmitting ions taking part in the electrochemical reaction of a battery. Examples of the organic solvent include a carbonate-based, ester-based, ether-based, ketone-based, alcohol-based, or aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like.

When a linear carbonate compound and a cyclic carbonate compound are mixed, a solvent having a high dielectric constant and a low viscosity may be provided. The cyclic carbonate compound and linear carbonate compound may be mixed together in a volume ratio, for example, ranging from about 1:1 to about 1:9.

Examples of an ester-based solvent include methylacetate, ethylacetate, n-propylacetate, dimethylacetate, methylpropionate, ethylpropionate, γ-butyrolactone, decanolide, valerolactone, mevalonolactone, caprolactone, and the like. The ether-based solvent may include, for example dibutylether, tetraglyme, diglyme, dimethoxyethane, 2-methyltetrahydrofuran, tetrahydrofuran, and the like, and the ketone-based solvent may include cyclohexanone, and the like. The alcohol-based solvent may include, for example, ethyl alcohol, isopropyl alcohol, and the like.

The organic solvent may be used singularly or in a mixture. When the organic solvent is used in a mixture, the mixture ratio may be controlled in accordance with a desirable battery performance.

In one embodiment, the electrolyte solution may further include an overcharge inhibitor additive such as ethylene carbonate, pyrocarbonate, or the like.

The lithium salt is dissolved in an organic solvent, supplies lithium ions in a battery, basically operates the rechargeable lithium battery, and improves lithium ion transportation between positive and negative electrodes therein. Examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$ (lithium bis (oxalato) borate, LiBOB), or a combination thereof. The lithium salt may be used in a concentration, for example, ranging from about 0.1 M to about 2.0 M. When the lithium salt is included within the above concentration range, an electrolyte solution may have excellent performance and lithium ion mobility due to optimal electrolyte conductivity and viscosity.

The separator 113 may include various materials suitable for use in a lithium battery, as long as it is capable of separating the negative electrode 112 from the positive electrode 114 and is able to provide a transporting passage of lithium ion. In one embodiment, the material of the separator 113 may have a low resistance to ion transport and an excellent impregnation for electrolyte solution. Examples of the material for the separator 113 include glass fiber, polyester, polyethylene, polypropylene, polytetrafluoroethylene (PTFE), or a combination thereof. The material of the separator 113 may have a form of, for example, a non-woven fabric or a woven fabric. In one embodiment, a polyolefin-based polymer separator such as polyethylene, polypropylene or may be used for the lithium ion battery. In order to ensure the heat resistance or mechanical strength, a coated separator including a ceramic component or a polymer material may be used. The separator 113 may have a mono-layered or multi-layered structure.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation of Positive Active Material

Example Embodiment 1: Preparation of Positive Active Material $Li_{0.93}Ni_{0.6}Co_{0.2}Mn_{0.2}O_2/Li_2O$ In this example, $NiSO_4$, $CoSO_4$, and $MnSO_4$ aqueous solutions respectively having a 2.4 M concentration were mixed in a mole ratio of 6:2:2, and an about 7.5 M NaOH aqueous solution and an about 15 M $NH_4OH$ aqueous solution were added thereto. The mixture was continuously mixed in a co-precipitator. The obtained mixture was co-precipitated at pH 11 for 8 hours at 40° C. at a speed of about 700 rpm to obtain a $(Ni_{0.6}Co_{0.2}Mn_{0.2})OH_2$ precursor.

The precursor was washed, dried in a 120° C. oven, and filtered and then, mixed with $Li_2CO_3$ in a weight ratio of about 1:1.05 with a hand blender. The obtained mixture was put in a furnace and fired at a speed of 2° C./min and a temperature of 790° C. for about 10 hours to prepare a Ni-rich oxide $Li_{0.93}Ni_{0.6}Co_{0.2}Mn_{0.2}O_2$.

An anhydrous ethanol and one part by mole of lithium oxide ($Li_2O$) (based on 100 parts by mole of the Ni-rich oxide) were mixed, and deionized water was added thereto to generate LiOH. The Ni-rich oxide was put in a beaker where the LiOH was dispersed and, then, was slowly dried at 90° C., while mixed therewith. The dried product was heat-treated at 800° C. for 6 hours under an oxygen atmosphere to prepare a positive active material by surface-modifying the Ni-rich oxide.

Comparative Examples 1 and 2

Each positive active material according to Comparative Examples 1 and 2 was a commercially available material widely-used for a medium and large-sized battery for PHEV, EV, ESS, and specifically KHX12 and NN KHX12 made by Umicore.

Figure 2:
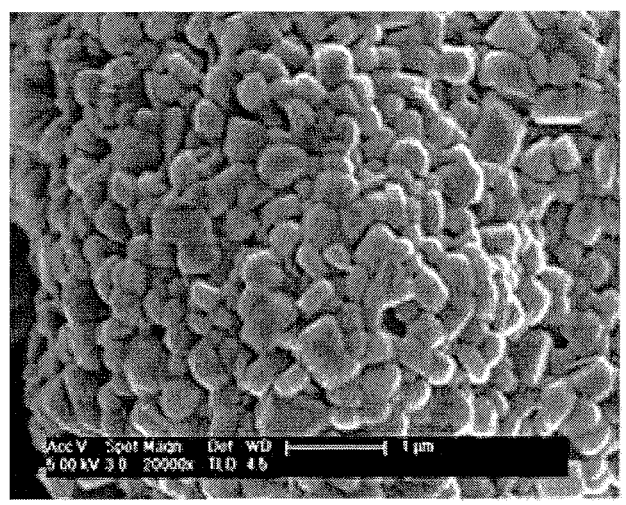
FIGS. 2 and 3 illustrate examples of scanning electron microscope (SEM) photographs of positive active material for a rechargeable lithium battery.

Evaluation 1: Scanning Electron Microscope (SEM) Analysis of Positive Active Material FIG. 2 illustrates an example of a scanning electron microscope (SEM) photograph showing the positive active material according to Example Embodiment 1. FIG. 3 illustrates an example of a photograph enlarging the SEM photograph of the positive active material of Example Embodiment 1. Referring to FIGS. 2 and 3, the positive active material of Example Embodiment 1 has a structure where the lithium-containing oxide was coated like a rod on the surface of the lithium nickel-based metal oxide.

Evaluation 2: Amount of Surface-Remaining Li

The amount of Li remaining on the surface of each positive active material according to Example Embodiment 1 and Comparative Examples 1 to 2 was measured, and the results are shown in Table 1. Referring to Table 1, the positive active material of Example Embodiment 1 showed a sharply reduced amount of Li remaining on the surface compared with the positive active materials of Comparative Examples 1 and 2.

TABLE 1

| | $Li_2CO_3$ [wt %] | LiOH [wt %] | Free Li [wt %] |
|---|---|---|---|
| Example 1 | 0.20 | 0.17 | 0.039 |
| Comparative Example 1 | 0.36 | 0.13 | 0.106 |
| Comparative Example 2 | 0.26 | 0.20 | 0.108 |

Evaluation 3: EELS (Electron Energy Loss Spectroscopy) Analysis

An EELS analysis was performed to examine whether or not lithium oxide ($Li_2O$) was formed on the surface of the positive active material of Example Embodiment 1. In general, $LiMO_2$- (herein, M is Ni, Co, Mn, Al, and the like)

is mainly present on the surface of a positive active material, but $LiMO_2$ coated with a metal depending on a coating material, a metal oxide, and the like are also distributed, and $Li_2CO_3$ and LiOH formed through a bond with lithium remaining on the surface are also found.

On the contrary, referring to FIG. 4, $Li_2O$ was formed on the surface of a positive active material according to an example embodiment through the addition of $Li_2O$ thereto. In other words, the $Li_2O$ showed a peak in a similarly low energy region to $Li_2CO_3$, but a peak in a different energy region from LiOH. As shown in FIG. 4, the peak had a larger size than the LiOH.

Manufacture of Rechargeable Lithium Battery Cell

Example Embodiment 2

In this example, 96 wt % of the positive active material according to Example Embodiment 1, 2 wt % of polyvinylidene fluoride (PVDF), and 2 wt % of acetylene black were mixed and then dispersed in N-methyl-2-pyrrolidone to prepare slurry. The slurry was coated on a 10 μm-thick aluminum foil and, then, dried and compressed to manufacture a positive electrode. As for a counter electrode of the positive electrode, metal lithium was used to manufacture a coin-type half-cell. An electrolyte solution was prepared using a mixed solution of fluoroethylene carbonate (FEC)/dimethyl carbonate (DMC)/diethyl carbonate (DEC) (15:45:40 of a volume ratio) and dissolving 1.3 M $LiPF_6$ therein.

Comparative Examples 3 and 4

Rechargeable lithium battery cells were respectively manufactured according to the same method as Example Embodiment 2, except for respectively using 96 wt % of the positive active materials according to Comparative Examples 1 and 2.

Evaluation 4: Capacity Retention

The rechargeable lithium battery cells of Example Embodiment 2 and Comparative Examples 3 and 4 were respectively 50 cycles charged and discharged within a range of 2.8 V to 4.3 V at current density of 1C-rate at 25° C., and their discharge capacities were measured. In addition, capacity retention was calculated as a ratio of discharge capacity at the 50th cycle relative to discharge capacity at the $1^{st}$ cycle and regarded as a cycle-life. The results are illustrated in FIG. 5.

Referring to FIG. 5, the rechargeable lithium battery cell of Example Embodiment 2 showed excellent cycle-life characteristics compared with the rechargeable lithium battery cells of Comparative Examples 3 and 4 after the $10^{th}$ cycle. Specifically, the rechargeable lithium battery cell of Example Embodiment 2 showed about 1.6% improved cycle-life at the 50th cycle. The reason is that the $Li_2O$ coating prevented direct contact between a positive active material and an electrolyte solution and reduced lithium remaining on the surface of the positive active material.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A positive active material for a rechargeable lithium battery, the positive active material comprising:
a lithium nickel-based metal oxide represented by Chemical Formula 1 and a lithium-containing oxide on a surface of the lithium nickel-based metal oxide:

wherein:
in Chemical Formula 1, M is one or more of Co, Mn, Al, Mg, Ti, Zr, or a combination thereof, 0 <x <1.1, and 0≤y<0.5,
the lithium-containing oxide is included in an amount of about 0.01 to about 10 parts by weight based on 100 parts by weight of the lithium nickel-based metal oxide,
the lithium-containing oxide is a coating layer that coats a part or a whole of the surface of the lithium nickel-based metal oxide,
the coating layer of the lithium-containing oxide has a rod shape or scale shape, and
the lithium-containing oxide includes $Li_2O$.

2. The positive active material as claimed in claim 1, wherein the coating layer consists of the lithium-containing oxide.

3. The positive active material as claimed in claim 1, wherein the lithium-containing oxide further includes at least one of LiOH and $Li_2CO_3$.

4. The positive active material as claimed in claim 1, wherein the coating layer has the rod shape, and has an aspect ratio of greater than or equal to about 1.

5. The positive active material as claimed in claim 1, wherein the lithium-containing oxide is included in an amount of 1 to 10 parts by weight based on 100 parts by weight of the lithium nickel-based metal oxide.

6. The positive active material as claimed in claim 1, wherein the lithium nickel-based metal oxide represented by Chemical Formula 1 with the lithium-containing oxide on the surface of the lithium nickel-based metal oxide is prepared by:
mixing a lithium raw material and a nickel-containing metal oxide precursor to prepare a mixture,
performing a first heat treatment on the mixture to prepare the lithium nickel-based metal oxide represented by Chemical Formula 1,
dry-mixing the lithium nickel-based metal oxide with the lithium-containing oxide, and
performing a second heat treatment on the dry-mixed lithium nickel-based metal oxide and lithium-containing oxide,
wherein the lithium-containing oxide includes $Li_2O$.

7. The positive active material as claimed in claim 1, wherein 0.1 ≤y≤0.4 in Chemical Formula 1.

8. The positive active material as claimed in claim 1, wherein Chemical Formula 1 is represented by Chemical Formula 2 or Chemical Formula 3:

where 0<x<1.1, 0<a<0.5, 0<b<0.5, and 0<a+b<0.5 in Chemical Formula 2 and Chemical Formula 3.

9. A rechargeable lithium battery, comprising:
a positive electrode including a positive active material as claimed in claim 1,
a negative electrode, and
an electrolyte solution.

10. A method of preparing the positive active material for a rechargeable lithium battery as claimed in claim 1, the method comprising:
mixing a lithium raw material and a nickel-containing metal oxide precursor to prepare a mixture, and heat-treating the mixture to prepare the lithium nickel-based metal oxide represented by Chemical Formula 1, and
dry-mixing the lithium nickel-based metal oxide with the lithium-containing oxide followed by heat treatment,
wherein the lithium-containing oxide includes $Li_2O$.

11. The method as claimed in claim 10, wherein the lithium-containing oxide further includes at least one of LiOH and $Li_2CO_3$.

12. The method as claimed in claim 10, wherein the mixture of the lithium raw material and nickel-containing metal oxide precursor is heat-treated at about 600° C. to about 1,000° C.

13. The method as claimed in claim 10, wherein the heat treatment of the dry-mixture of the lithium nickel-based metal oxide with the lithium-containing oxide is performed at about 400° C. to about 700° C.

14. The method as claimed in claim 10, wherein y is within a range of 0.1≤y≤0.4 in Chemical Formula 1.

15. The method as claimed in claim 10, wherein the nickel-containing metal oxide precursor is represented by Chemical Formula 4:

$$Me(OH)_2 \qquad (4)$$

where Me is represented by Chemical Formula 5, $$Ni_kM_{1-k} \qquad (5)$$

where M is one or more of Co, Mn, Al, Mg, Ti, Zr, or a combination thereof and where 0.5<k≤1.0.

* * * * *